United States Patent
Thiede et al.

(10) Patent No.: US 7,185,899 B2
(45) Date of Patent: Mar. 6, 2007

(54) RISER CART

(75) Inventors: Martin E. Thiede, Owatonna, MN (US); Mark R. Friedrichs, Owatonna, MN (US)

(73) Assignee: Wenger Corporation, Owatonna, MN (US)

( * ) Notice: Subject to any disclaimer, the term of this patent is extended or adjusted under 35 U.S.C. 154(b) by 75 days.

(21) Appl. No.: 10/761,758

(22) Filed: Jan. 21, 2004

(65) Prior Publication Data
US 2004/0150177 A1    Aug. 5, 2004

Related U.S. Application Data

(60) Provisional application No. 60/441,554, filed on Jan. 21, 2003.

(51) Int. Cl.
*B62B 3/00* (2006.01)

(52) U.S. Cl. .............. 280/47.35; 280/47.34; 280/79.11; 280/79.3; 211/189; 211/190

(58) Field of Classification Search .. 280/47.34–47.35, 280/47.26, 47.24, 47.19, 33.991, 33.996–33.998, 280/33.997, 79.3, 79.11, 79.7; 211/126.1, 211/189–90, 190, 194; 182/179.1, 178.1
See application file for complete search history.

(56) References Cited

U.S. PATENT DOCUMENTS

| | | | | |
|---|---|---|---|---|
| 548,273 A * | 10/1895 | Rouse | ................... | 248/289.11 |
| 2,514,308 A * | 7/1950 | Burg | ........................ | 280/79.3 |
| 2,595,521 A * | 5/1952 | Hanson | ................ | 211/119.004 |
| 2,684,225 A * | 7/1954 | Johnson | ................... | 248/213.1 |
| 3,191,959 A * | 6/1965 | Heimbruch et al. | ........ | 280/641 |
| 3,689,098 A * | 9/1972 | Rubin | ................... | 280/33.998 |
| 3,744,812 A * | 7/1973 | Langhausen | ................ | 280/35 |
| 3,747,706 A * | 7/1973 | Paine et al. | .................. | 182/113 |
| 3,747,708 A * | 7/1973 | Wenger et al. | .............. | 182/152 |
| 3,827,573 A * | 8/1974 | Guerette | ..................... | 211/149 |
| 3,967,734 A * | 7/1976 | Morgan et al. | ............. | 211/199 |
| 3,974,894 A | 8/1976 | Wenger et al. | | |
| 4,037,851 A * | 7/1977 | Romero | ..................... | 280/79.3 |
| 4,346,906 A * | 8/1982 | Thorpe | .................. | 280/33.996 |

(Continued)

FOREIGN PATENT DOCUMENTS

GB    2 90895 A    5/1986

OTHER PUBLICATIONS

PCT/US04/01517 International Search Report.

*Primary Examiner*—Christopher P. Ellis
*Assistant Examiner*—Vaughn Coolman
(74) *Attorney, Agent, or Firm*—Patterson, Thuente, Skaar & Christensen, P.A.

(57) ABSTRACT

A riser cart including a cart support frame, a first swing arm post assembly and a second swing arm post assembly. The cart support frame has a plurality of wheels rotatably attached thereto. The first swing arm post assembly is mounted to the cart support frame. The first swing arm post assembly includes a first swing arm post and a first plurality of swing arms. The first swing arms are rotatable between a storage position and a loading position. The second swing arm post assembly is mounted to the cart support frame. The second swing arm post assembly includes a second swing arm post and a second plurality of swing arms. The second swing arms are rotatable between a storage position and a loading position.

2 Claims, 17 Drawing Sheets

U.S. PATENT DOCUMENTS

| | | | |
|---|---|---|---|
| 4,871,076 A * | 10/1989 | Schramm | 211/189 |
| 4,895,381 A * | 1/1990 | Farlow | 280/33.997 |
| 5,123,552 A * | 6/1992 | Aggelen | 211/194 |
| 5,381,873 A | 1/1995 | Kniefel et al. | |
| 5,765,702 A | 6/1998 | Bustos et al. | |
| 5,787,647 A | 8/1998 | Dettmann et al. | |
| 5,901,505 A | 5/1999 | Dettmann et al. | |
| 6,540,183 B1 * | 4/2003 | Preuss | 248/129 |
| 6,938,730 B2 * | 9/2005 | Hairston | 182/17 |
| 2002/0036118 A1 * | 3/2002 | Ono | 182/178.1 |
| 2004/0150177 A1 * | 8/2004 | Thiede et al. | 280/79.3 |
| 2004/0222179 A1 * | 11/2004 | Garcia | 211/206 |
| 2004/0231922 A1 * | 11/2004 | Schwoerer | 182/178.1 |

* cited by examiner

RISER CART

REFERENCE TO RELATED APPLICATION

The present application claims priority to U.S. Provisional Application No. 60/441,554, filed Jan. 21, 2003. The identified provisional application is hereby incorporated by reference in its entirety.

FIELD OF THE INVENTION

The present invention relates generally to a piece of furniture for storage. More particularly, the present invention relates to a piece of furniture for storing equipment, specifically choral risers.

BACKGROUND OF THE INVENTION

In many fields, it is necessary to store objects during periods in which it is not desired to use the objects. Various types of storage systems have been developed to address needs in this area.

Certain objects, such as choral risers, are bulky to transport to and from a desired use point. Examples of riser systems are disclosed in the following patents: Dettmann et al., U.S. Pat. Nos. 5,901,505; 5,787,647; Kniefel et al., U.S. Pat. No. 5,381,873; Wenger et al., U.S. Pat. Nos. 3,974,894; 3,747,708; and Paine et al., U.S. Pat. No. 3,747,706.

Further, the size and shape of these risers as well as the materials of construction are such that they may cause damage to surrounding objects if conveyed in an unmanageable manner. Likewise, the same size and shape characteristics of choral risers make them cumbersome to transport by hand and can lead to serious and/or chronic injury. In addition, choral risers may take up quite a bit of storage area if not stored efficiently.

In these situations, it is desirable to place the risers on a portable cart, such that transportation is easier for those who must periodically set up and take down these risers while allowing for storage that requires far less space. One such system is marketed by the assignee of the present application.

SUMMARY OF THE INVENTION

The present invention is directed to a riser cart that is particularly suited for efficient transportation and storage of choral risers. The riser cart generally includes a support frame that is mounted on casters. The frame supports a series of swing arms that both support and contain multiple folded risers in a stacked array. A support post is also mounted on the support frame independently from the swing arms and is adapted to receive one or more choral riser back rails.

DETAILED DESCRIPTION OF THE INVENTION

A riser cart according to the present invention is shown generally at 10 in the figures. The riser cart 10 consists of a cart support frame 12, swing arm post assemblies 14 for securing a plurality of risers, and back rail support post assemblies 18 upon which are mounted a plurality of riser back rails.

Figure 1:
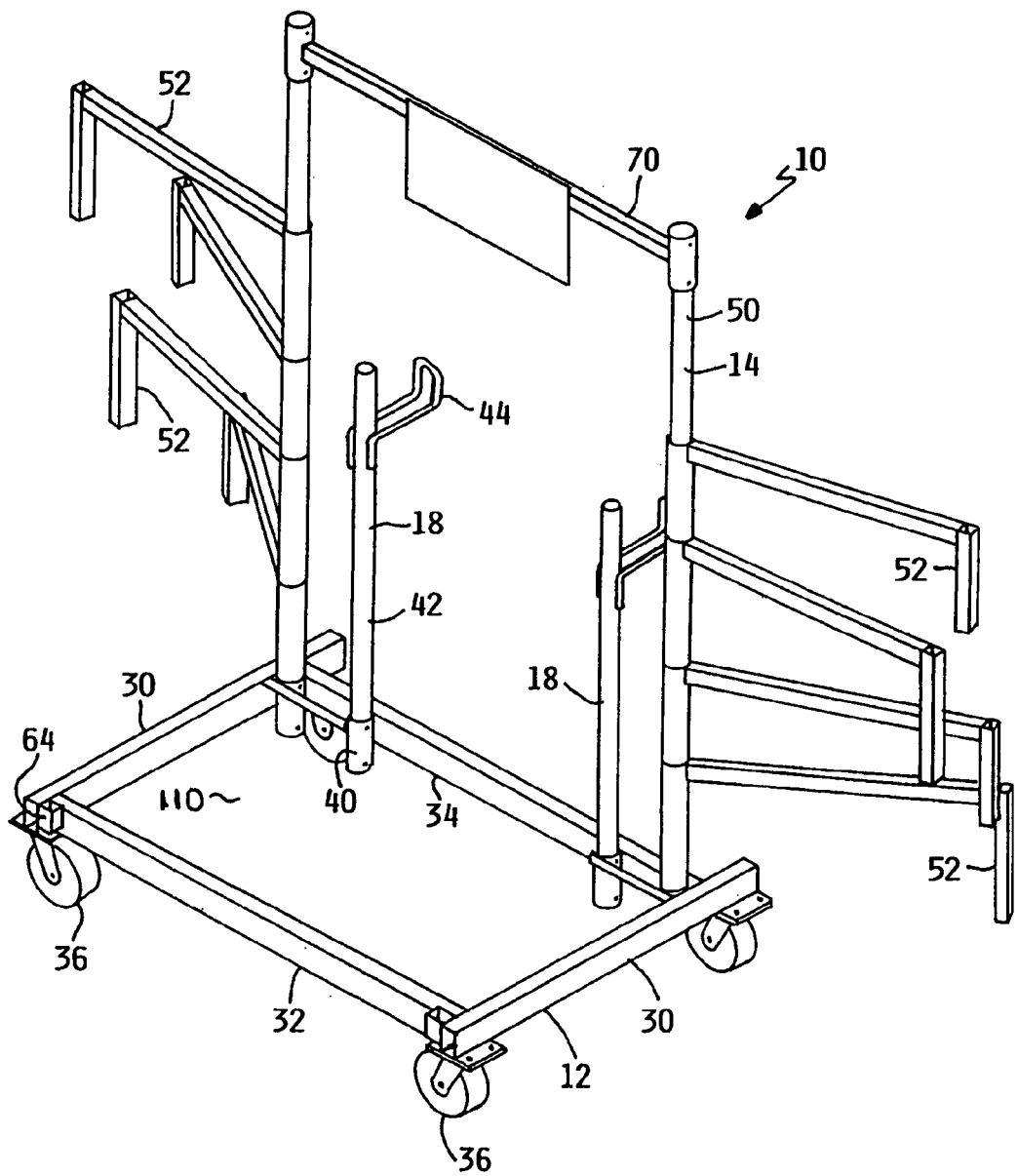
FIG. 1 is a perspective view of a riser cart with swing arms extended according to an embodiment of the present invention.
Figure 2:
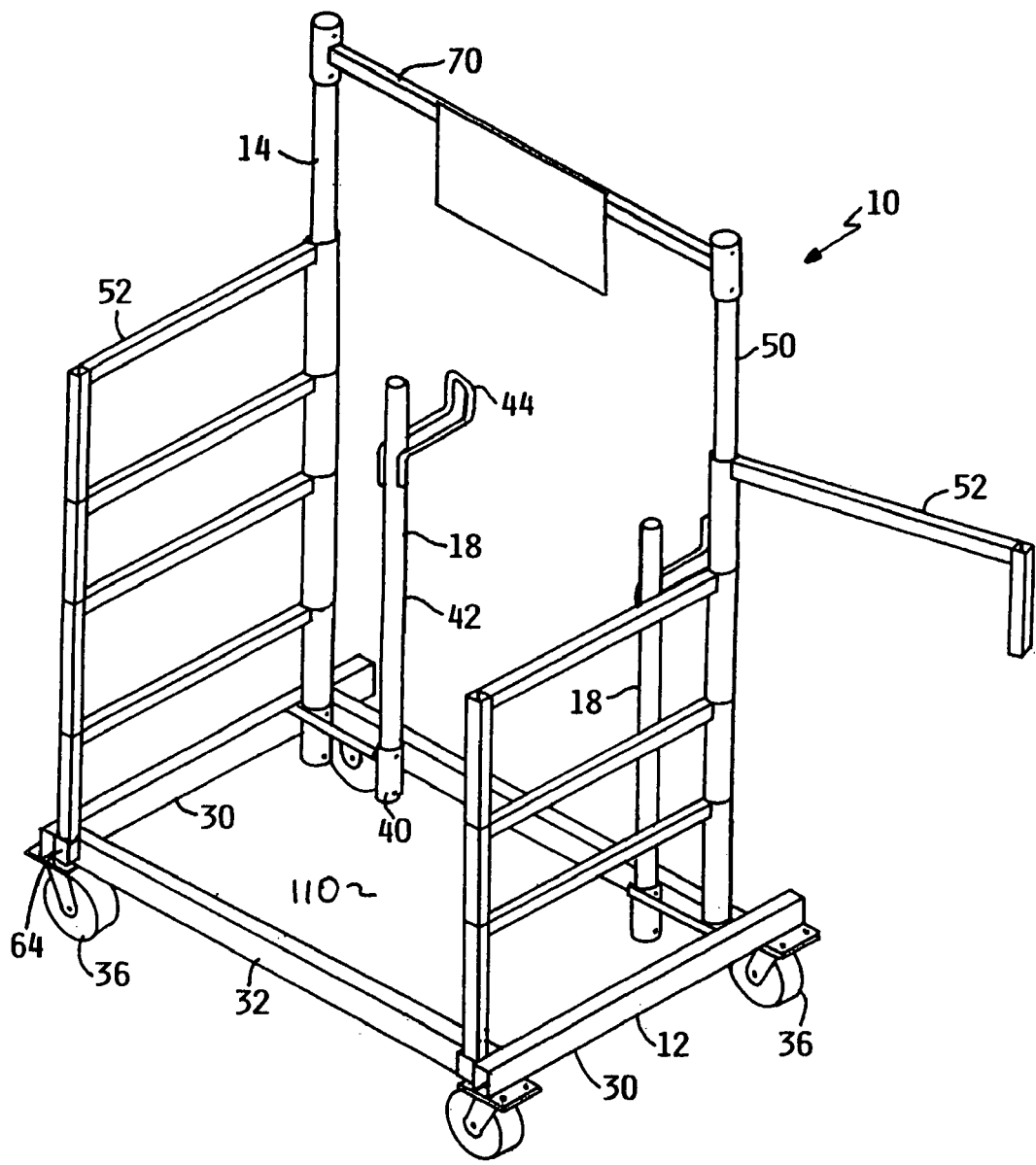
FIG. 2 is a perspective view of a riser cart with swing arms secured.

Referring to FIGS. 1 and 2, the support frame 12 consists of two side beams 30, a front beam 32, and a rear beam 34. Casters 36 are mounted at the ends of each side beam 30 to provide uniform support to and allow for portability of riser cart 10. The beams 30, 32, and 34 are preferably made of metal, preferably carbon steel.

Figure 6:
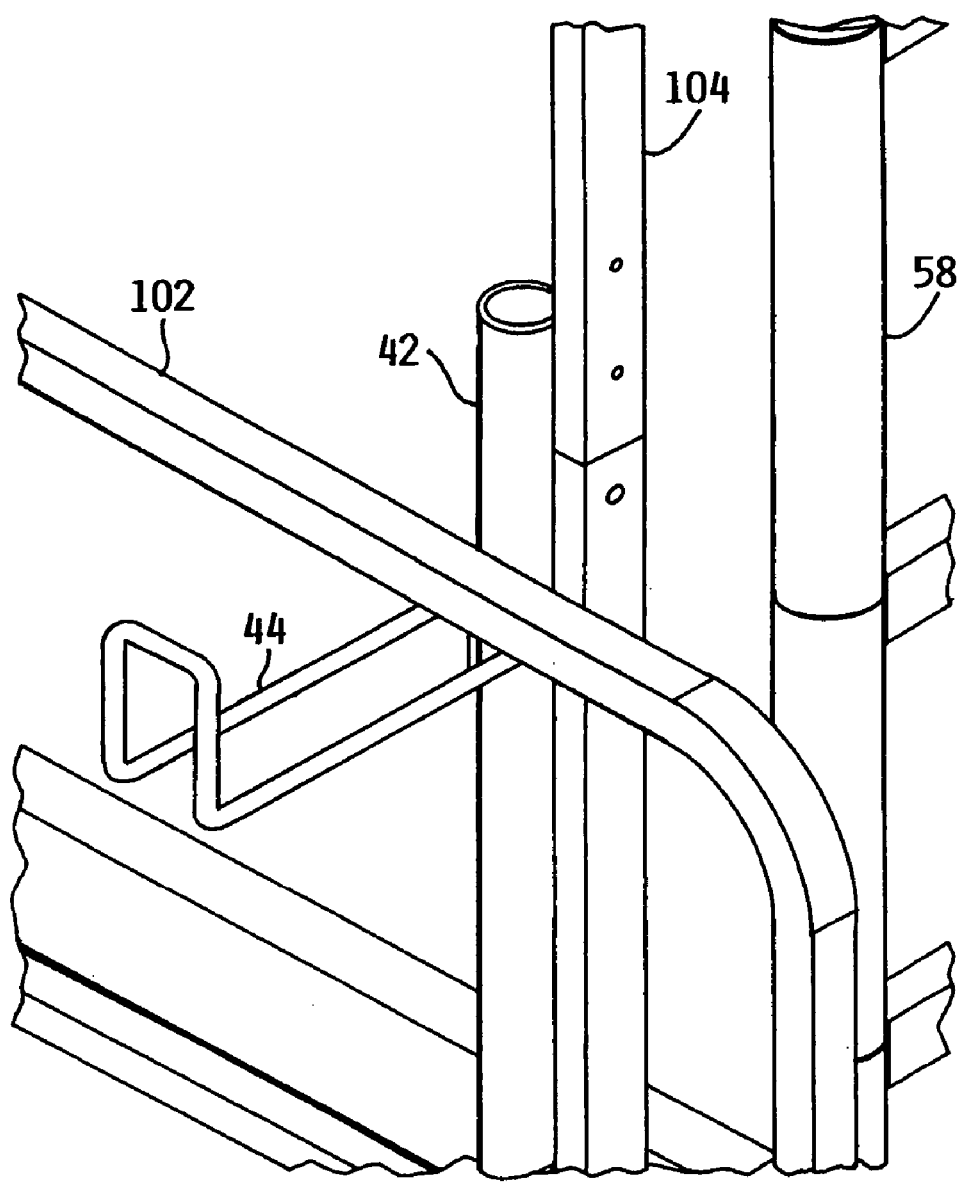
FIG. 6 is a close-up view of a back rail support post holding one back rail.

Back rail support post assemblies 18 are mounted to side beams 30 proximate to rear beam 34. Support post holder 40 fixes support post 42 in a vertical position. Referring to FIGS. 1, 2, and 6, a support hook 44 provides the necessary support to retain a plurality of back rails.

Figure 3:
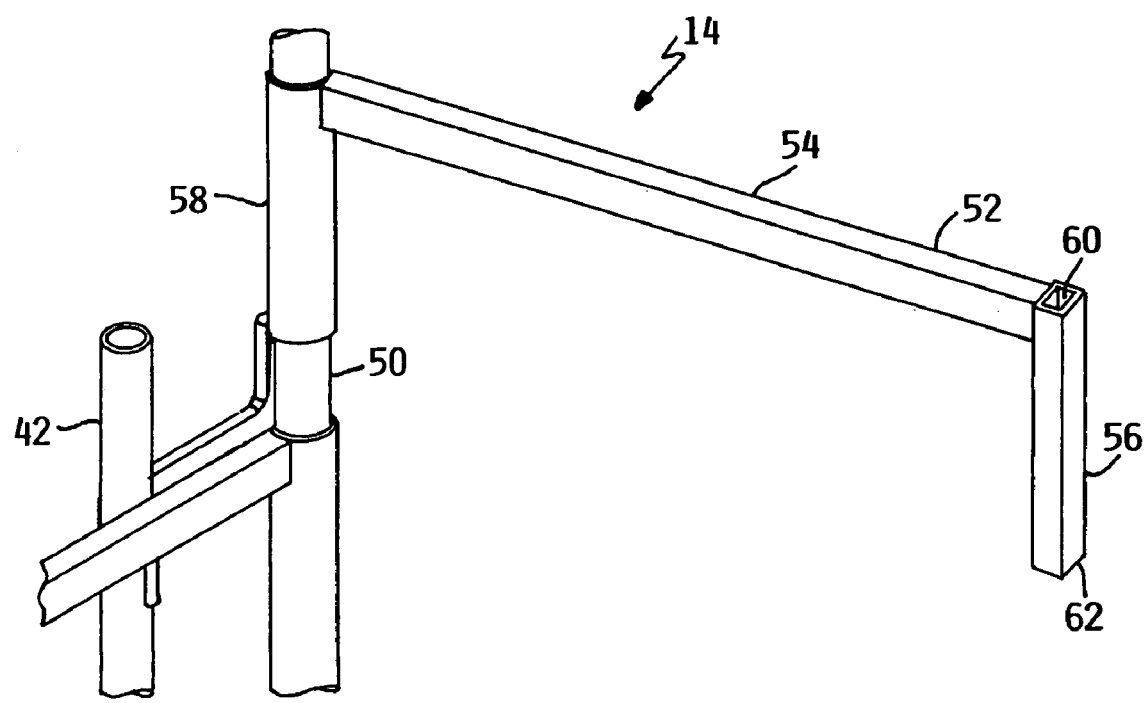
FIG. 3 is a close-up view of an extended swing arm.

Swing arm post assemblies 14 are also mounted to side beams 30. Swing arm post assembly 14 consists of a swing arm post 50 and a plurality of swing arms 52. Referring to FIGS. 1 and 3, swing arms 50 include a horizontal support bar 54 and keeper 56. Keeper 56 has a depression 60 at its top surface and a projection 62 from its bottom surface. The projection 62 of the keeper 56 in closest proximity to cart support frame 12 engages a holding socket 64 that is fastened to front beam 32. Swing arm 52 is slidably attached to swing arm post 50 by means of concentric pivot tube 58. Pivot tube 58 slides axially along swing arm post 50 as necessary to secure and release risers.

Support rail 70 extends across both swing arm posts 50 to provide added structural integrity to riser cart 10.

Figure 4:
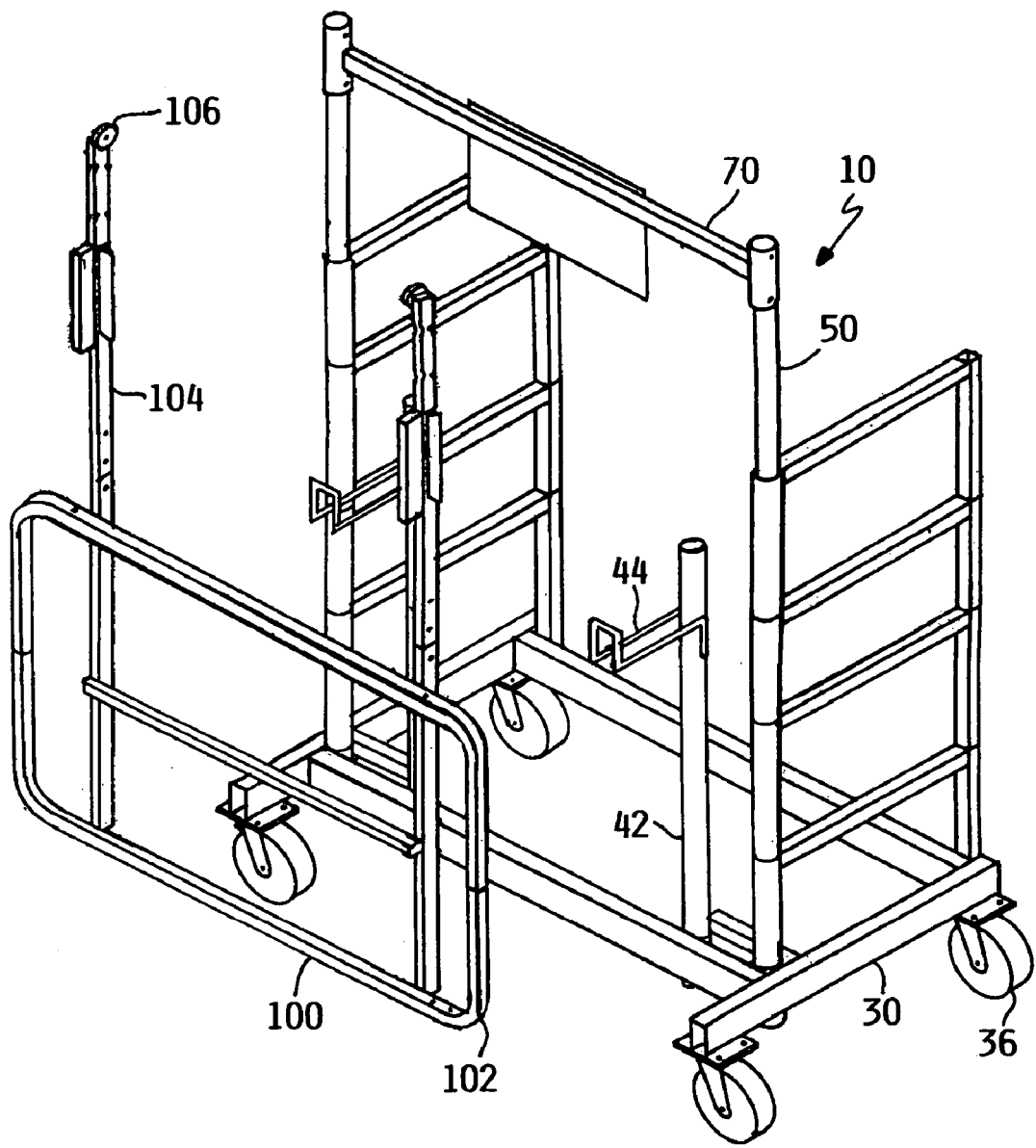
FIG. 4 is a perspective view of a riser cart showing the back rail support posts.

Referring to FIG. 4, a back rail 100 has a back rail frame 102, back rail legs 104, and positioning wheels 106.

Figure 5:
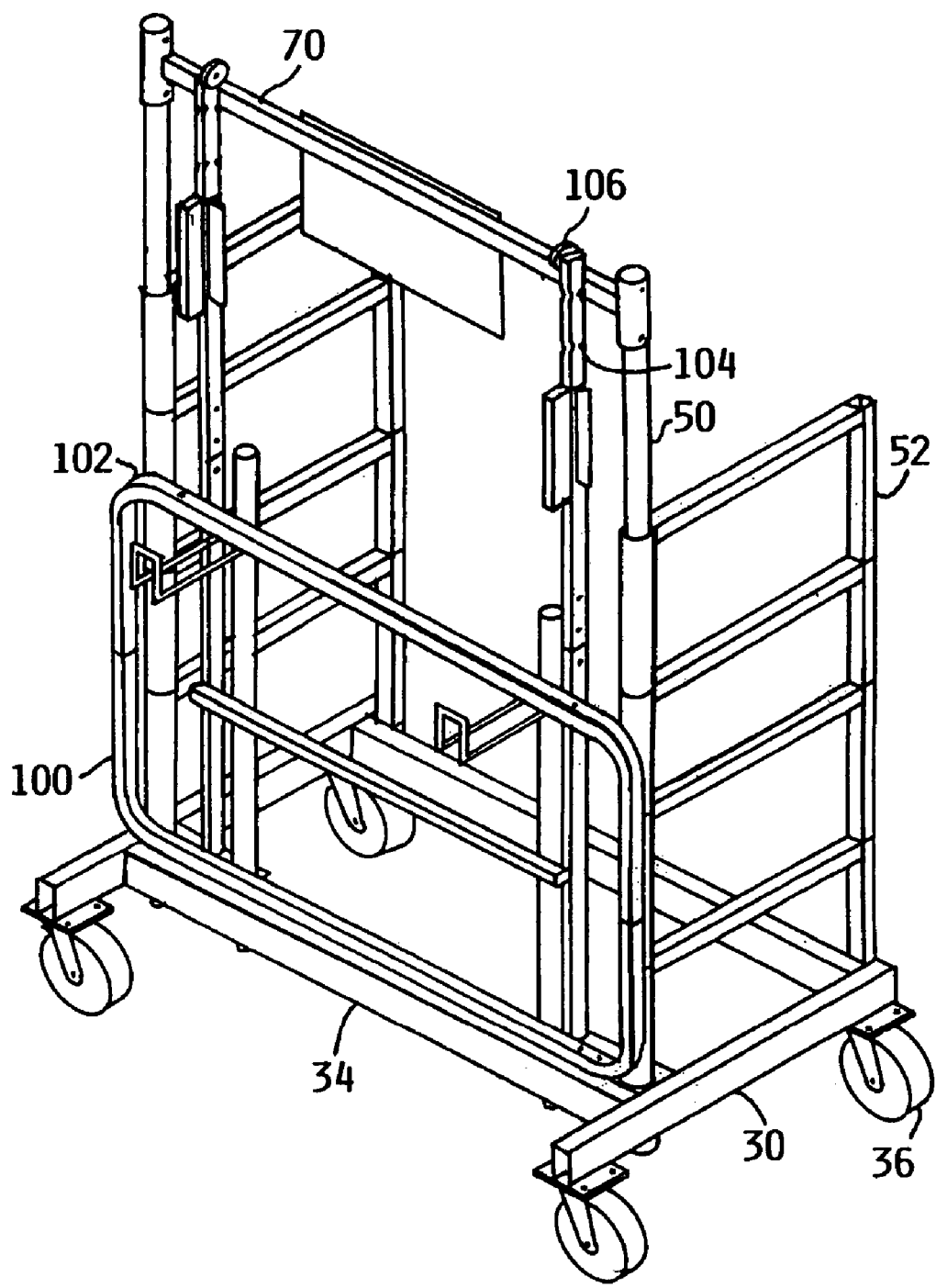
FIG. 5 is a perspective view of a riser cart holding one back rail.

In operation, back rail 100 is lifted with positioning wheels 106 pointing upwards and the back rail legs 104 next to riser cart 10. Back rail 100 is placed onto support hooks 44 with each back rail leg 104 facing toward support posts 42 as shown in FIG. 6. Note that the back rail legs 104 are outside of support post 42. The mounted back rail 100 is shown in FIG. 5.

Figure 7:
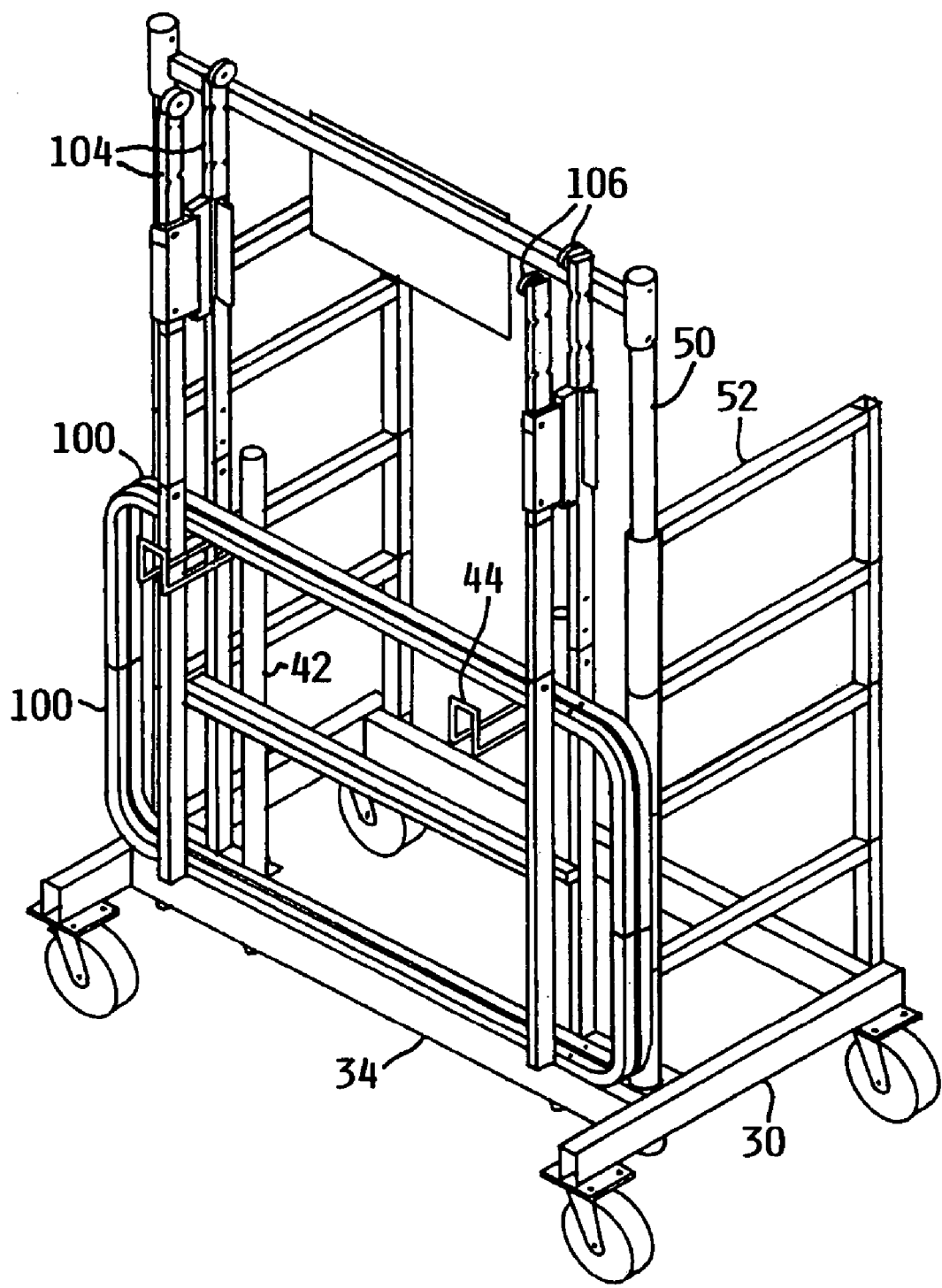
FIG. 7 is perspective view of a riser cart holding two back rails.
Figure 8:
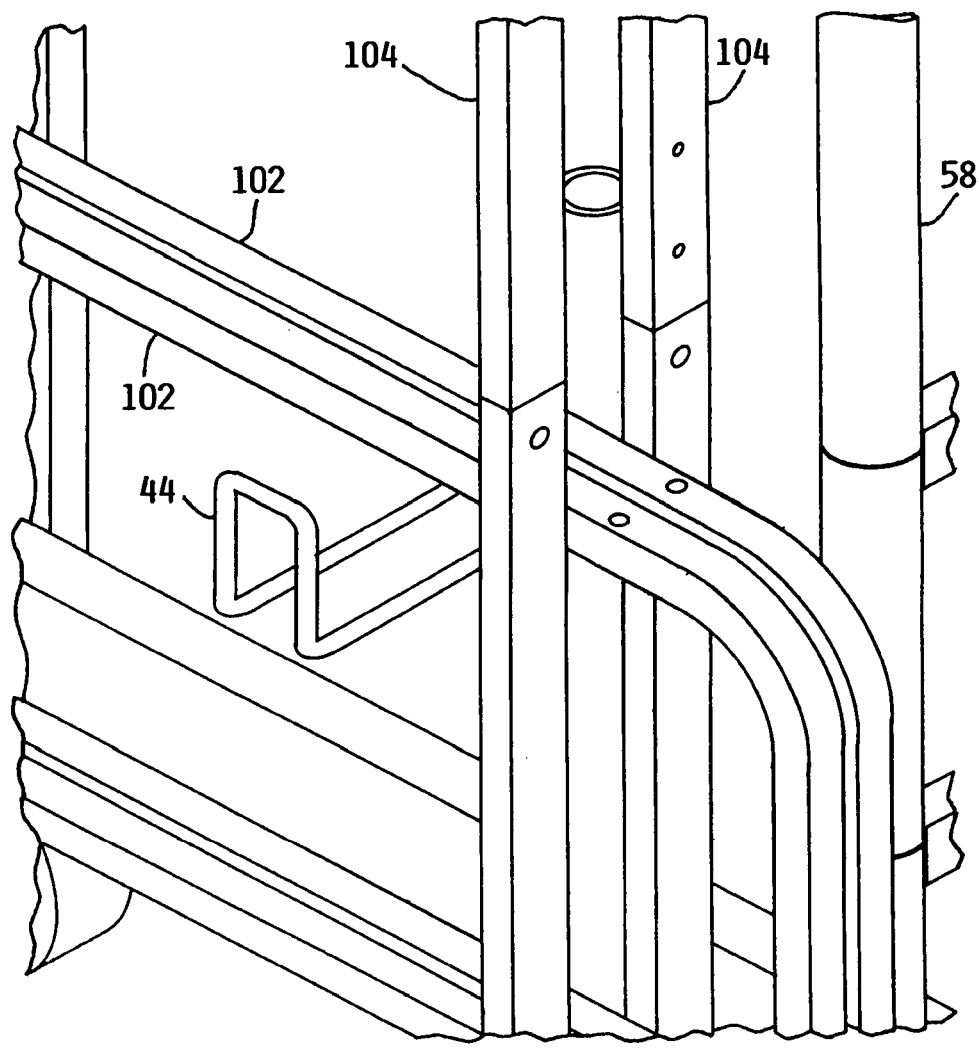
FIG. 8 is a close up view of a back rail support post holding two back rails.

Referring to FIG. 7, to load a second back rail 100, the second back rail 100 is lifted with its positioning wheels 106 pointing upward and the back rail legs 104 facing away from riser cart 10. Referring to FIG. 8, the second back rail 100 is placed onto support hooks 44 with the back rail frames 102 of both back rails 100 touching. Note that the back rail legs 104 are on opposite sides of the back rail frames 102.

Figure 9:
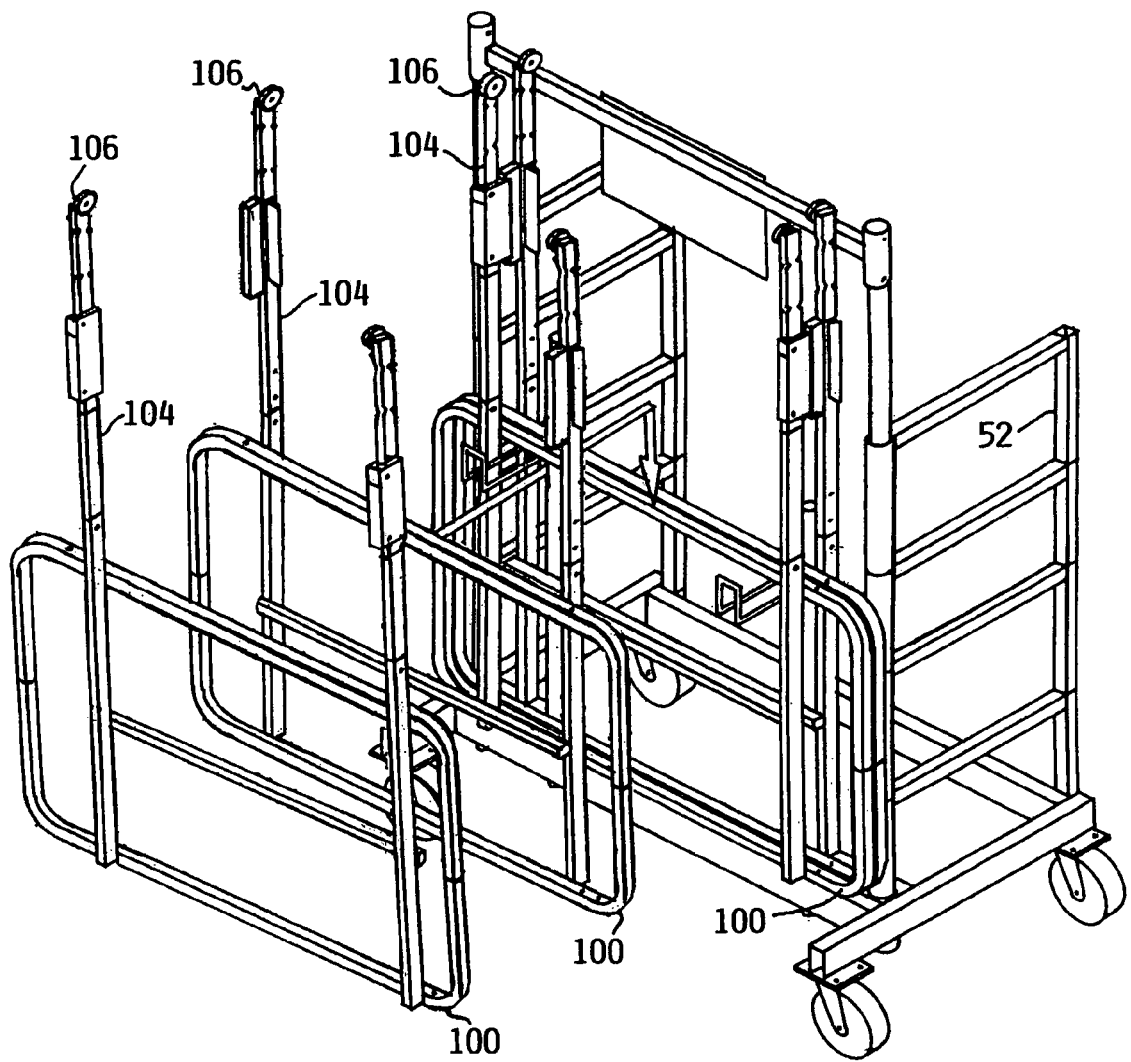
FIG. 9 is a perspective view of a riser cart with three back rails in aligned position for securing on the back rail support post.
Figure 10:
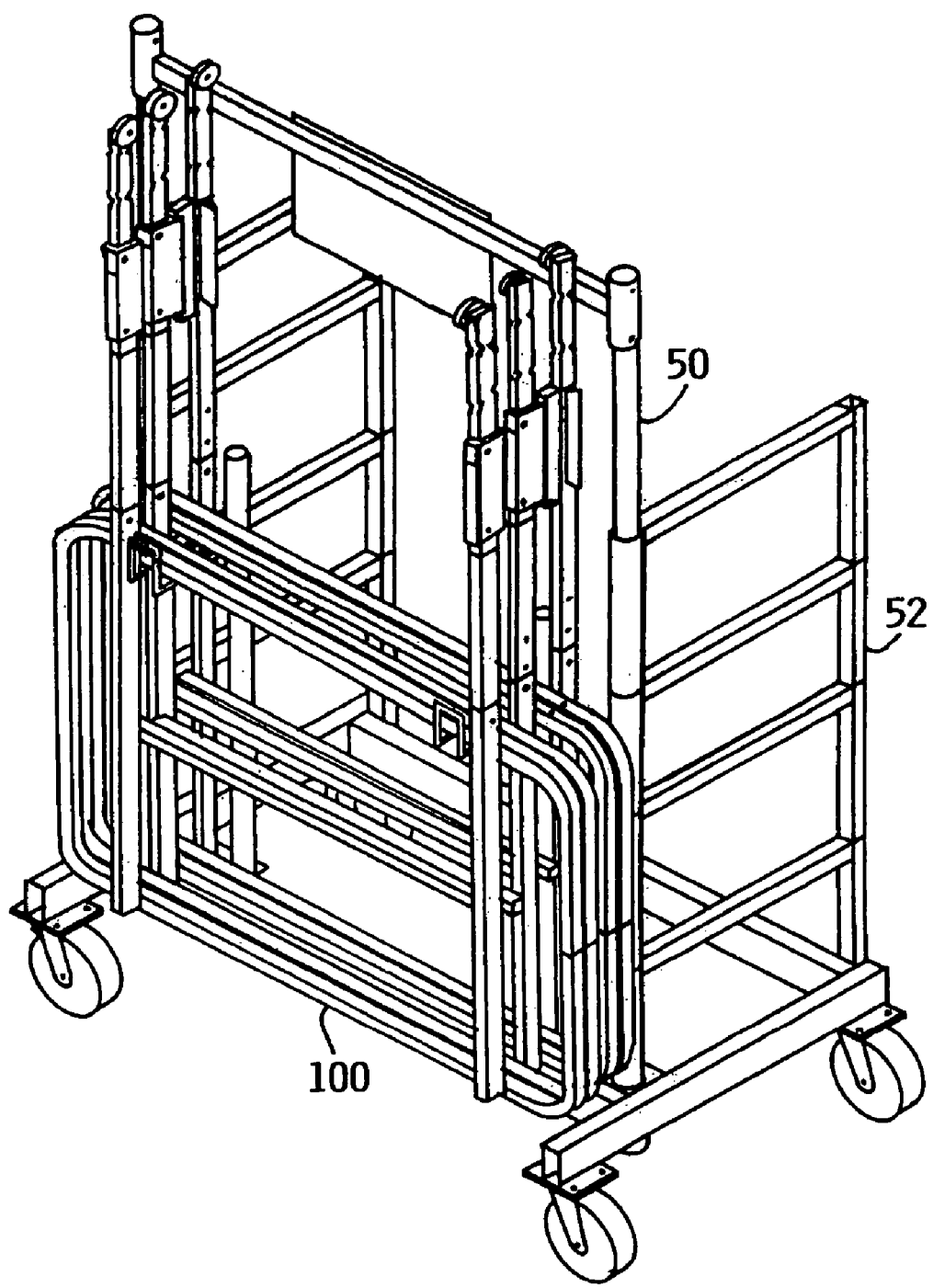
FIG. 10 is a perspective view of a riser cart holding three back rails.
Figure 11:
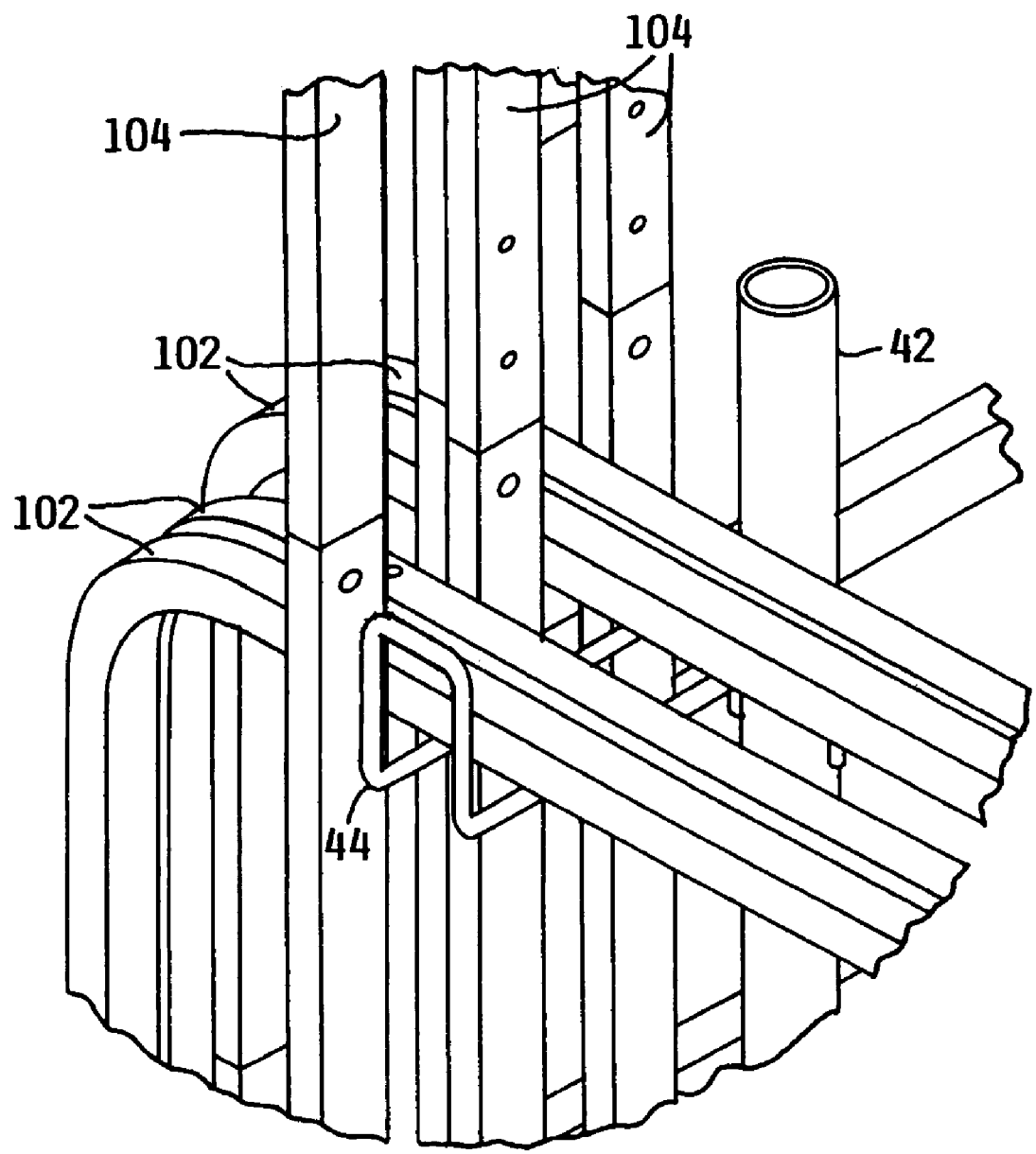
FIG. 11 is a close up view of a back rail support post holding three back rails.

Referring to FIGS. 9, 10 and 11, third and fourth back rails 100 may be mounted to riser cart 100. In this arrangement, back rail frames 102 are touching and back rail legs 104 of the second and third back rails 100 nest together.

Referring back to FIGS. 1 and 12, the swing arms 52 are rotatable about swing arm post 50 to facilitate loading and unloading of risers 120. Swing arms 52 rotate outward to allow for full access to the support area 110 of riser cart 10, and swing inward to a substantially parallel position with respect to each other to secure risers 120 upon riser cart 10.

Figure 12:
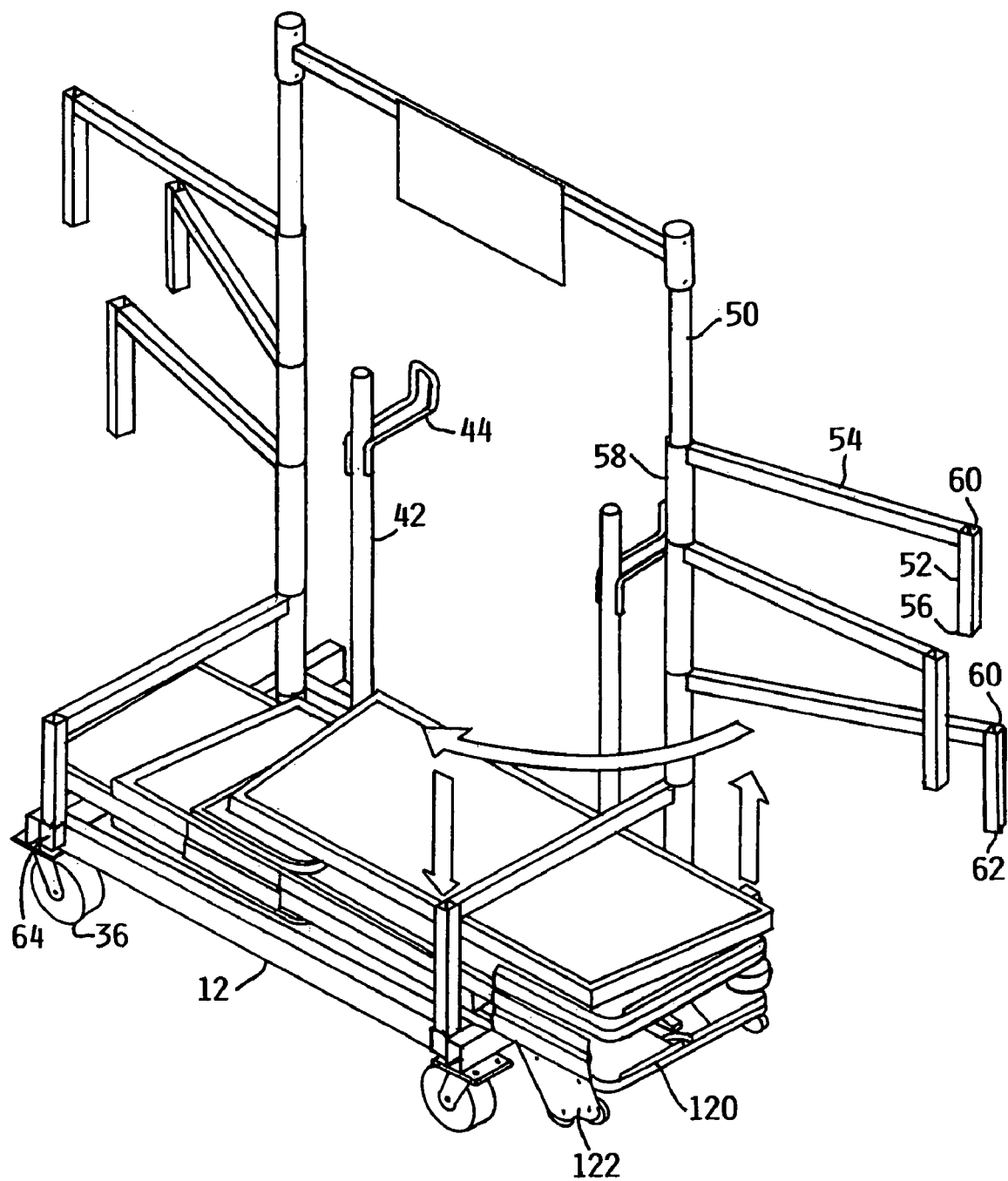
FIG. 12 is a perspective view of a riser cart securing a first riser.

Referring to FIG. 12, keepers 56 of individual swing arms 52 are alternately sized across riser cart 10 and also vertically up their respective swing arm posts 50. In the preferred embodiment, the top keeper 56 of one side of riser cart 10 would have an axial dimension of ten inches, while the corresponding keeper 56 on the opposite side would have an axial dimension of thirteen inches. These dimensions alternate down each swing arm 52. These alternate dimensions facilitate the stacking of risers 120, as one end of a folded riser 120 will have a greater thickness than the other and require more vertical space. Additionally, these alternating vertical dimensions enhance the restraint of each riser 120 during transport. Naturally, other dimensional variations are possible and are dependent on the characteristics of the particular equipment to be carted and stored.

In operation, loading of risers 120 begins by opening swing arms 52 by pushing upward on the underside of the horizontal support bar 54 of the upper swing arm 52 as close to swing arm post 50 as possible. Lifting swing arm 52 in this manner frees keeper 56 of that swing arm 52 by disengaging projection 62 of that keeper 56 from depression 60 of the keeper 56 directly below. Referring to FIG. 1, this operation is continued until all swing arms 50 are disengaged and rotated away from the support area 110.

Next, a first folded riser 120 is placed onto riser cart support frame 12 with riser positioning wheels 122 at one end under a thirteen-inch keeper 56. Positioning wheels 122 will hang over the end of riser cart support frame 12. Referring to FIG. 12, the two lowest swing arms 52 are rotated inward over the first riser 120. It may be necessary to lift all of the swing arms 52 high enough for the two lower swing arms 52 to clear riser 120. At this point, the projections 62 of keepers 56 of two lower swing arms 52 are inserted into holding socket 64 and the first riser 120 is secure.

Figure 13:
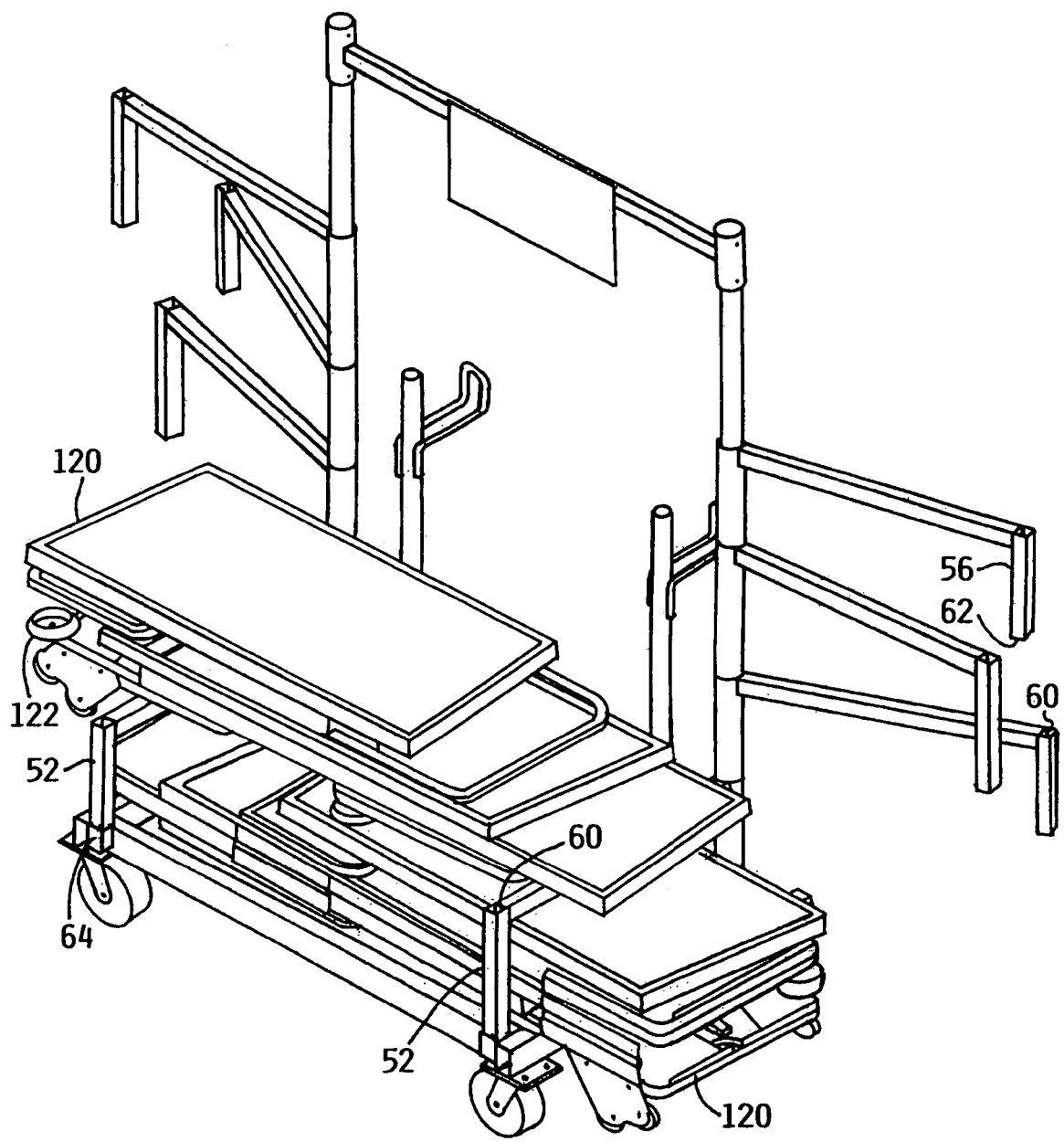
FIG. 13 is a perspective view of a riser cart in position to receive a second riser.
Figure 14:
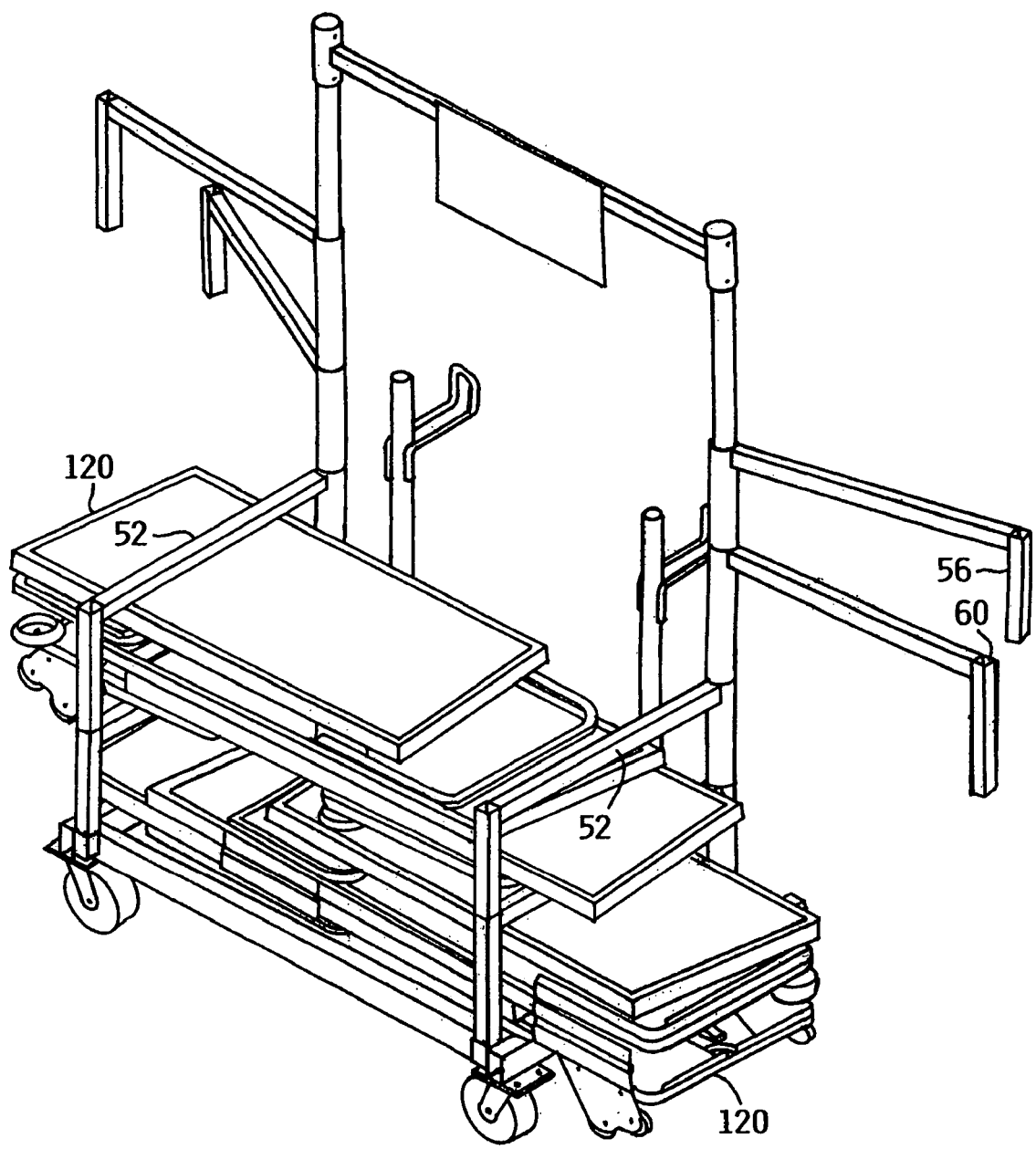
FIG. 14 is a perspective view of a riser cart securing a second riser.

Referring to FIGS. 13 and 14, a second folded riser 120 is placed on the now secured swing arms 52 holding the first riser 120. The positioning wheels 122 of second riser 120 are positioned opposite from those of first riser 120. These positioning wheels 122 of second riser 120 likewise hang outside of the supporting swing arm 52. The two swing arms 52 now above second riser 120 are rotated inward. Projections 62 of keepers 56 of these two swing arms 52 are inserted into depressions 60 of the keepers 56 directly below.

Figure 15:
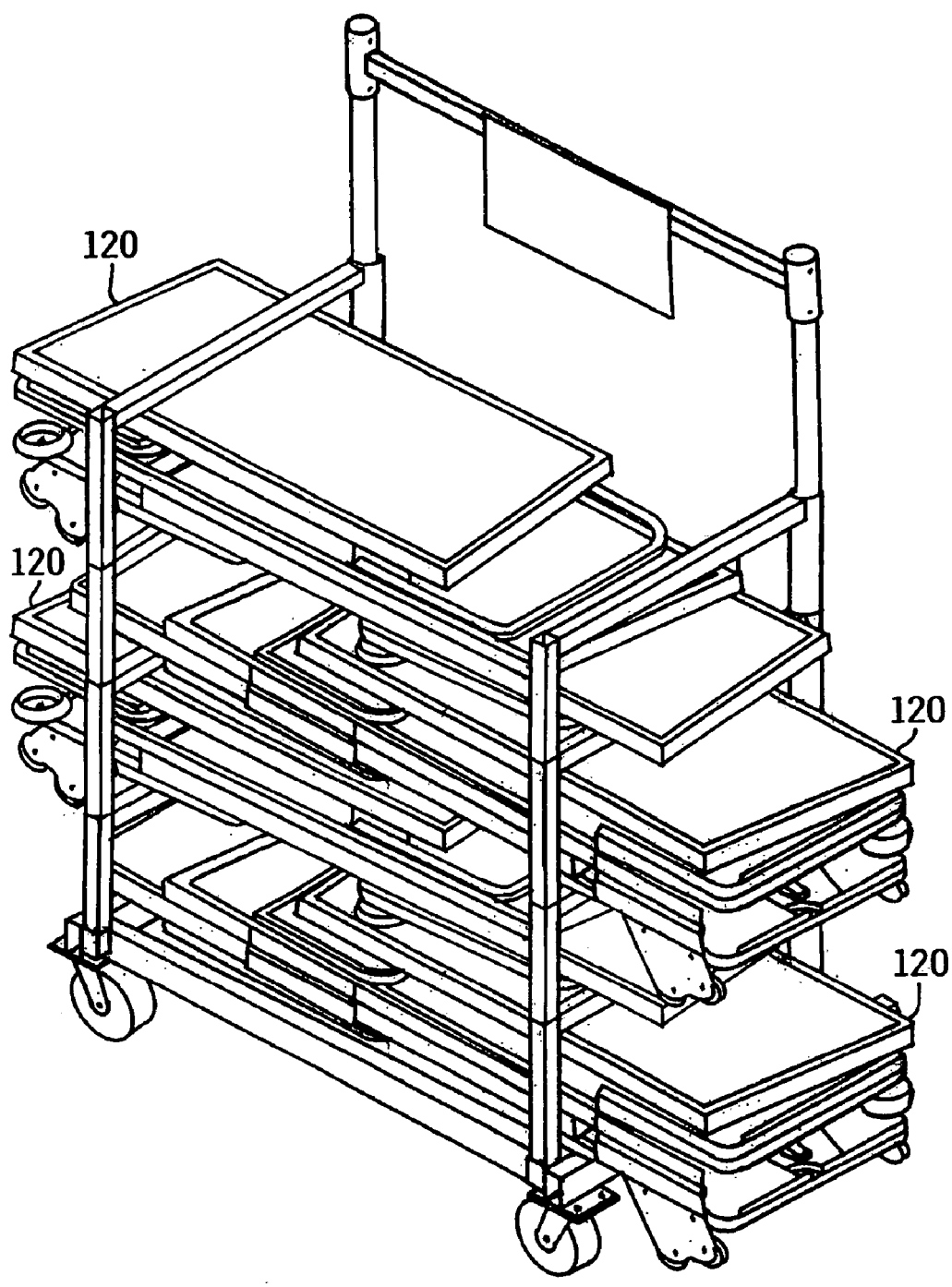
FIG. 15 is a perspective view of a riser cart securing four risers.

Referring to FIG. 15, third and fourth risers can be loaded onto riser cart 10 using the same procedure as above.

Figure 16:
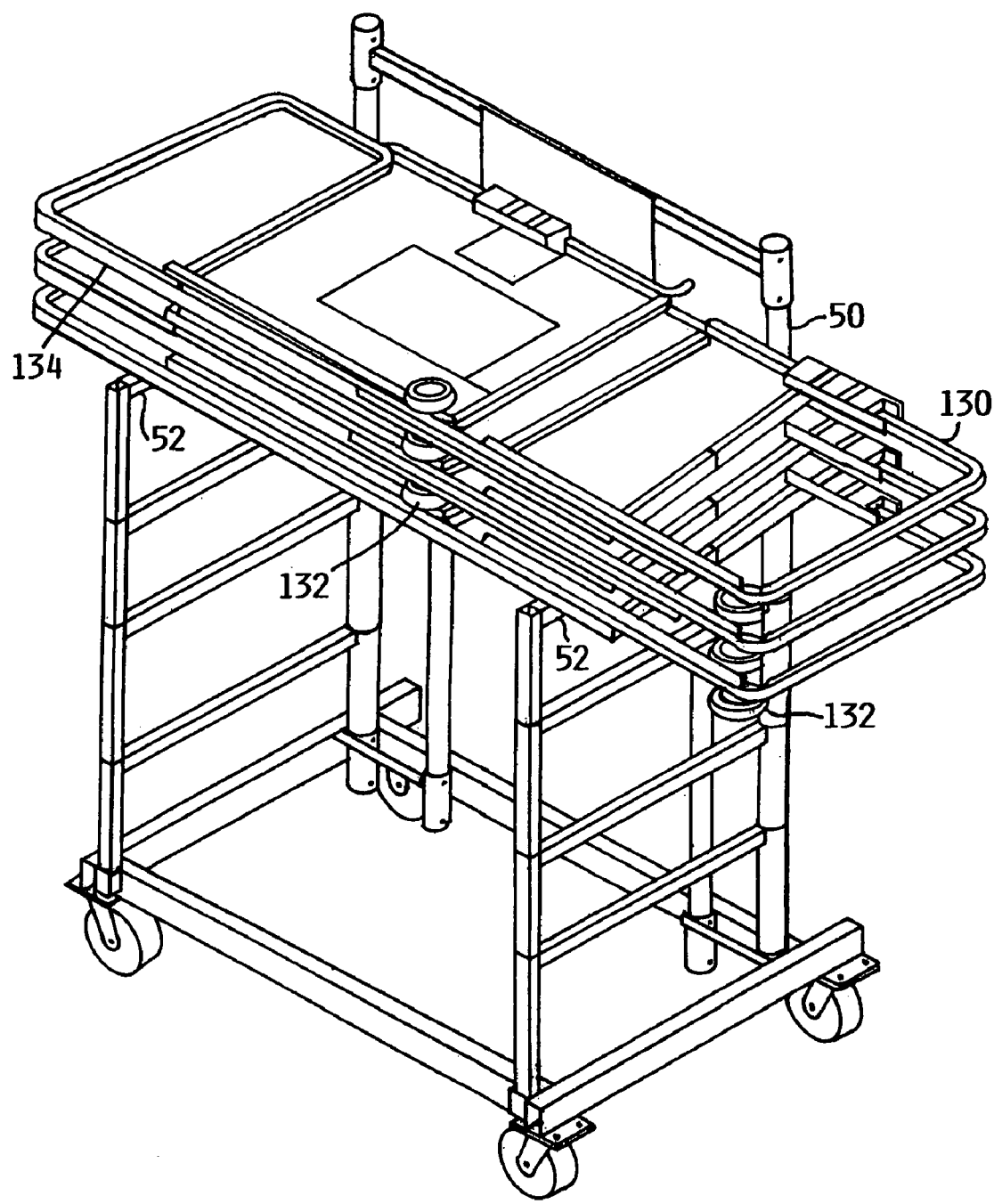
FIG. 16 is a perspective view of a riser cart supporting one or more Fourth-steps.
Figure 17:
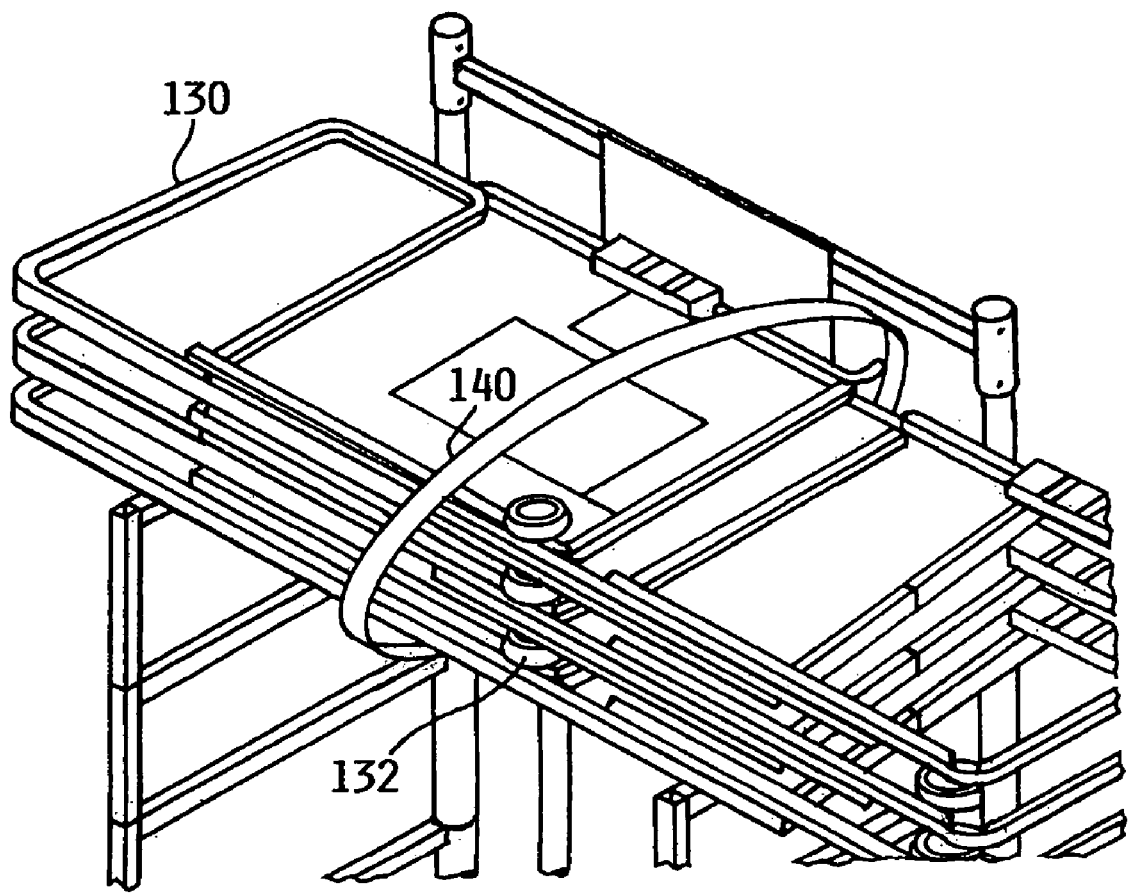
FIG. 17 is a close-up view of a cinch strap securing one or more Fourth steps.

In addition, a Fourth step 130 may be loaded onto riser cart 10. A Fourth step 130 has wheels 132 and a carpet side 134. Referring to FIG. 16, the Fourth steps 130 are placed onto the top set of swing arms 52 (preferably with the carpet side 134 facing downward) with their positioning wheels 132 facing outward, away from swing arm posts 50. Referring to FIG. 17, a cinch strap 140 is fastened around the stacked Fourth steps 130. In this arrangement, the choral risers and related components may be safely transported and stored.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A riser cart comprising:

a cart support frame having a plurality of wheels rotatably attached thereto;

a first swing arm post assembly mounted to the cart support frame, wherein the first swing arm post assembly includes a first swing arm post and a first plurality of swing arms having first and second ends, wherein the first swing arms are rotatable proximate the first ends between a storage position and a loading position and are engageable with each other at the second ends; and a second swing arm post assembly mounted to the cart support frame, wherein the second swing arm post assembly includes a second swing arm post and a second plurality of swing arms having first and second ends, wherein the second swing arms are rotatable proximate the first ends between a storage position and a loading position and are engageable with each other at the second ends, wherein the first and second plurality of swing arms each include a pivot tube through which the first and second swing arm posts, respectively, extend;

wherein the first and second plurality of swing arms each further include a horizontal support bar and a keeper attached to the horizontal support bar opposite the swing arm post, wherein the horizontal support bar is attached to the pivot tube, and wherein the keeper is attached to an end of the horizontal support bar that is opposite the pivot tube; and wherein the cart support frame includes a pair of holding sockets that are adapted to receive lower ends of the keepers when the first and second swing arms are in the storage position.

2. A method of using a riser cart comprising:

providing a riser cart having a cart support frame, a first swing arm post assembly and a second swing arm post assembly, wherein the first and second swing arm post assemblies each comprises a swing arm post and pivotally and second swing arms pivotally mounted to the swing arm post at first ends thereof and being engageable at a second end thereof;

placing a first object on the cart support frame;

rotating the first swing arms from a loading position to a storage position where the first swing arms extend over the first object;

placing a second object on the first swing arms so that the second object is located in a spaced apart relationship from the first object;

wherein each of the first swing arms comprises a first pivot tube, a first horizontal support bar and a first keeper, wherein the first pivot tube and the first keeper are attached to opposite ends of the first horizontal support bar, and wherein the first pivot tube extends over the swing arm post and further comprising retaining the first swing arms in storage position by engaging lower ends of the first swing arms with holding sockets attached to the cart support frame.

* * * * *